(12) United States Patent
Gosselin et al.

(10) Patent No.: US 7,474,198 B2
(45) Date of Patent: Jan. 6, 2009

(54) MANUAL INTERFACE INCLUDING AN ACTUATION BLOCK AND TRAIN OF ARTICULATED SEGMENTS

(75) Inventors: Florian Gosselin, Vanves (FR); Tanguy Jouan-De-Kervenoael, Neauphle le Chateau (FR); Christian Dechelle, Chilly-Mazarin (FR)

(73) Assignee: Commissariat a l'Energie Atomique (FR)

( * ) Notice: Subject to any disclaimer, the term of this patent is extended or adjusted under 35 U.S.C. 154(b) by 387 days.

(21) Appl. No.: 10/582,642

(22) PCT Filed: Dec. 14, 2004

(86) PCT No.: PCT/FR2004/050688
§ 371 (c)(1),
(2), (4) Date: Jun. 12, 2006

(87) PCT Pub. No.: WO2005/059732
PCT Pub. Date: Jun. 30, 2005

(65) Prior Publication Data
US 2007/0105673 A1    May 10, 2007

(30) Foreign Application Priority Data
Dec. 15, 2003  (FR) .................................. 03 51056

(51) Int. Cl.
*H04B 3/36* (2006.01)
(52) U.S. Cl. ............... 340/407.1; 340/407.2; 74/490.01
(58) Field of Classification Search ............. 340/407.1, 340/407.2; 74/490.01, 89.2; 600/595, 592, 600/593; 318/568.1
See application file for complete search history.

(56) References Cited

U.S. PATENT DOCUMENTS

| 5,587,937 | A | 12/1996 | Massie et al. |
| 5,912,658 | A | 6/1999 | Bergamasco et al. |
| 5,967,580 | A * | 10/1999 | Rosheim ...................... 294/88 |
| 6,413,229 | B1 | 7/2002 | Kramer et al. |
| 6,593,718 | B1 * | 7/2003 | Yamazoe ................ 318/568.11 |
| 6,705,177 | B2 * | 3/2004 | Okuno et al. ............... 74/490.1 |
| 7,339,574 | B2 * | 3/2008 | Kyung et al. ................ 345/163 |

FOREIGN PATENT DOCUMENTS

FR    2 832 345    11/2001

OTHER PUBLICATIONS

XP-002288977 Proceedings of DETC'02, ASME 2002 Design Engineering Technical Conferences, Montreal, Canada Sep. 29-Oct. 2, 2002 "Mechanical Design Of A Haptic Interface For The Hand", A. Frisoli, et al pp. 1-8.

(Continued)

*Primary Examiner*—Van T. Trieu
(74) *Attorney, Agent, or Firm*—Baker & Hostetler, LLP

(57) ABSTRACT

An actuation block for a train of segments, that can be used as a manual interface terminating by a finger grip (31) of the user, comprises a base (1) fixed to the hand or arm of the user and two or three motors (5, 32) oriented so that their main extension direction, or the direction of their output shaft, is parallel to a first pivoting segment (16) of the train. The actuation block is thus compact. Applications may include control arms or, on the contrary, force return arms.

10 Claims, 4 Drawing Sheets

OTHER PUBLICATIONS

Figure 1:
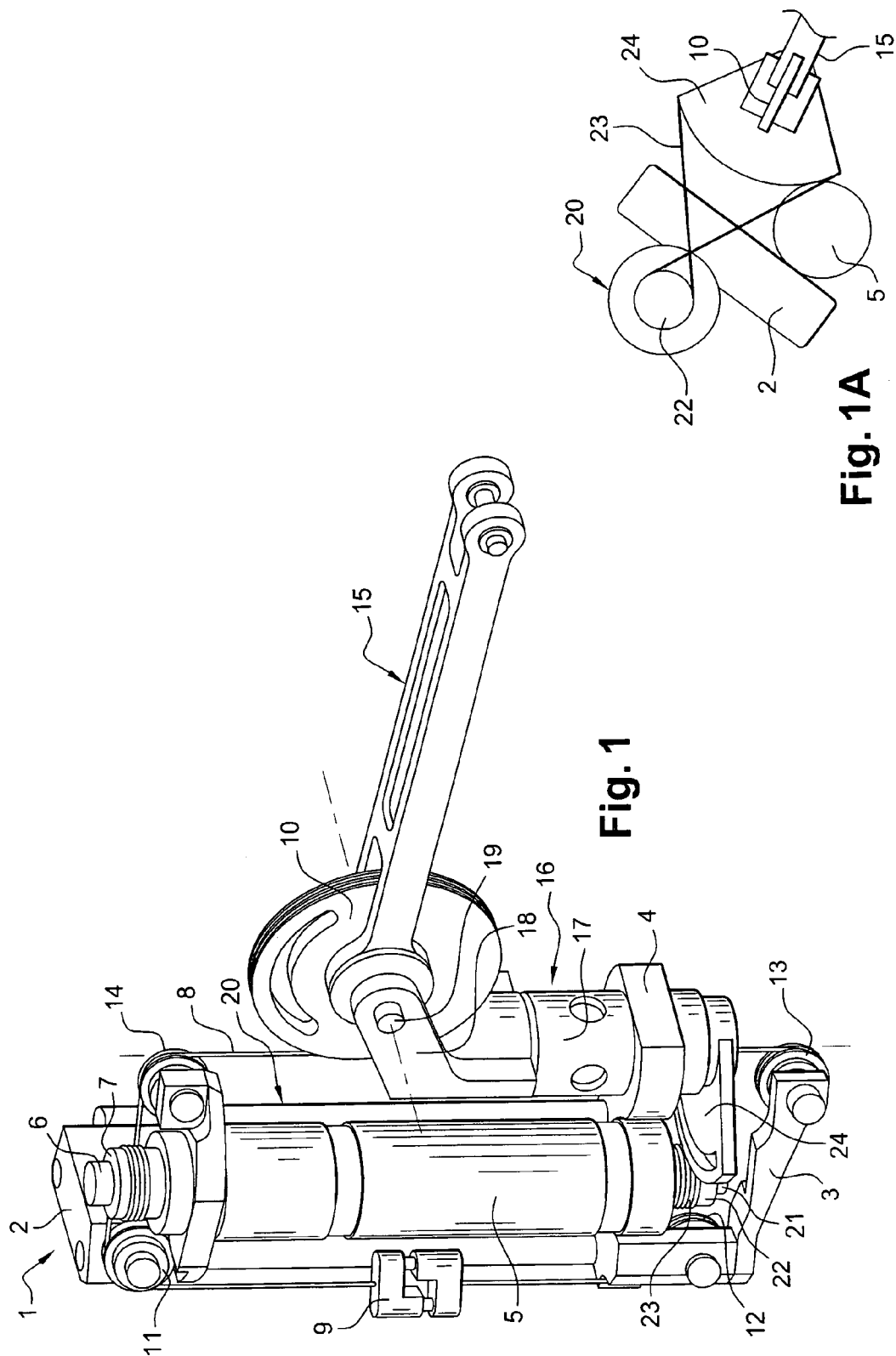

International Search Report which issued in the corresponding PCT application, PCT/FR2004/050688, citing the above references, May 23, 2005.

International Preliminary Examination Report (IPER) with English translation which issued in the corresponding PCT application FR2004/050688, May 23, 2005.

* cited by examiner

MANUAL INTERFACE INCLUDING AN ACTUATION BLOCK AND TRAIN OF ARTICULATED SEGMENTS

The subject of this invention is an actuation block and a train of articulated segments included in a manual interface.

For the purpose of this description, an actuation block denotes an assembly provided with motors and transmissions leading to articulated segments of the train to control their displacements, or otherwise in the case of trains manipulated by an operator, to apply a sensitive force to them to make control easier and more pleasant while measuring movements using associated encoders. In all these cases, the motors usually have the additional effect of maintaining the train of segments in an at-rest position by opposing a static resistance to gravity.

The application of this invention relates to manual interfaces worn on an arm by a user and that either obey hand movements or transmit movements or other signals to the user, depending on the case. Document FR 03 00294 that has not yet been divulged describes an example that is improved herein. Other interfaces are described in the article by Frisoli et al "Mechanical Design of a Haptic Interface for the Hand" in "Proceedings of DECT'02, ASME 2002 Design Engineering Technical Conferences and Computer and Information in Engineering Conference", in Montreal, Sep. 29 to Oct. 2, 2002; and on the site http://intro.kz.tsukuba.ac.jp/vrlab web/wearablemaster/wearablemaster e.html ("Wearable Master" interface).

We often find it unfortunate that actuation blocks are cumbersome, heavy and difficult to handle, and collision conditions can easily appear between the train of segments and motors.

Thus, one purpose of the invention is to supply an actuation block in which these disadvantages are less important.

The actuation block comprises an end plate, a first segment articulated to the end plate and a second segment articulated to the first segment, two motors and two cable transmissions associated with segment rotation movements, rotation movements from the first segment being pivoting, the motors being installed on the end plate and with a main extension direction coinciding with an output shaft direction, and the main extension directions of the two motors being parallel to the first segment.

The advantage that is achieved is that the motors are placed side by side on the end plate and on the first segment, forming a compact bundle of parts. The invention can be generalised to more complex blocks; one of them comprises a third segment articulated to the second segment, a third motor installed on the base, a third transmission between the third motor and the third segment, the third motor having a main extension direction coinciding with a direction of the output shaft and that is parallel to the first segment.

As already mentioned, one advantageous application of the invention is a manual interface that then includes such an actuation block, and also a means of fastening the end plate to a user's transradial limb (the end plate possibly being fixed or placed on a table), a train of articulated segments including the segments of the actuation block and one end of the train of segments gripped by the user.

Figure 2:
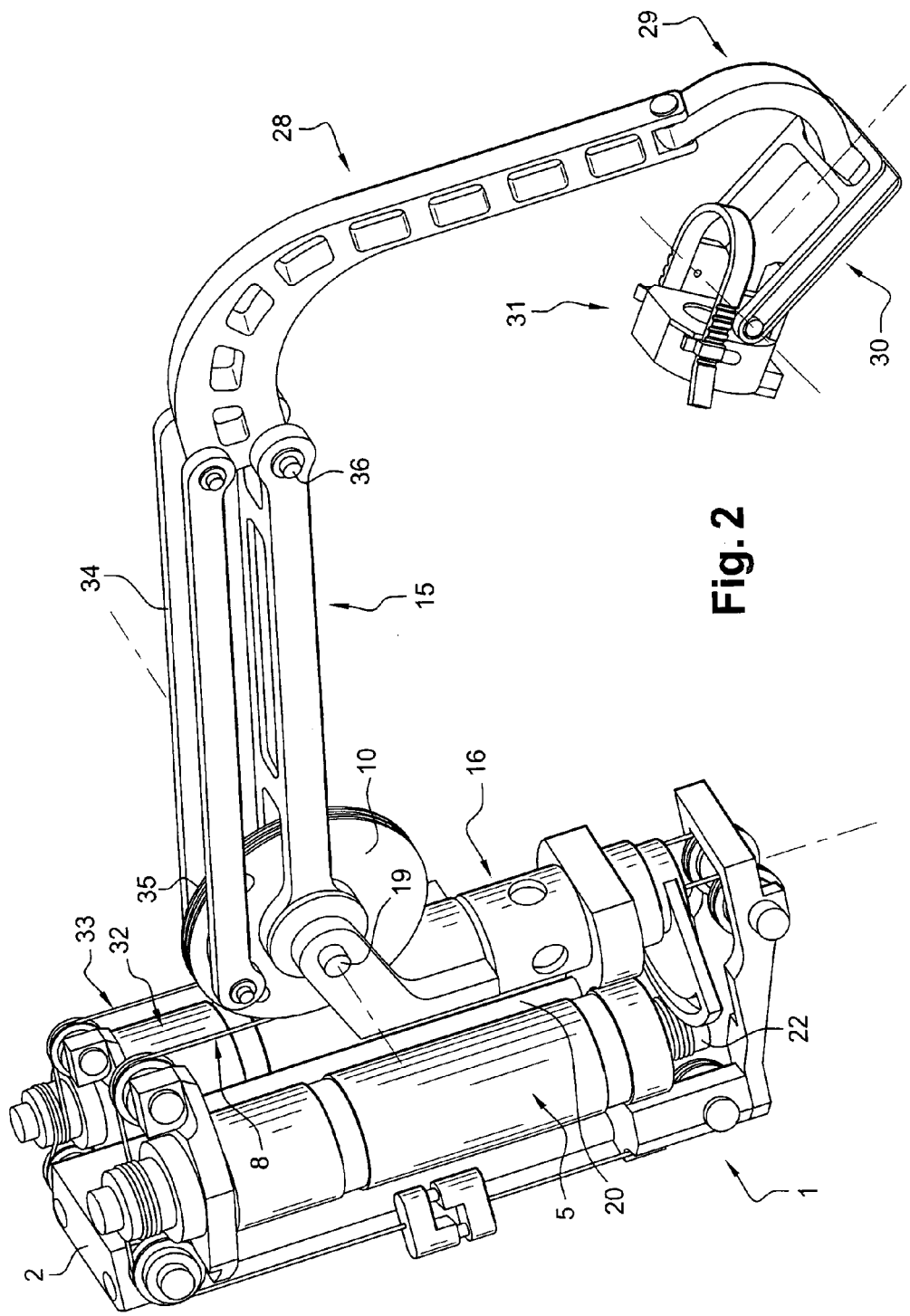
Figure 3:
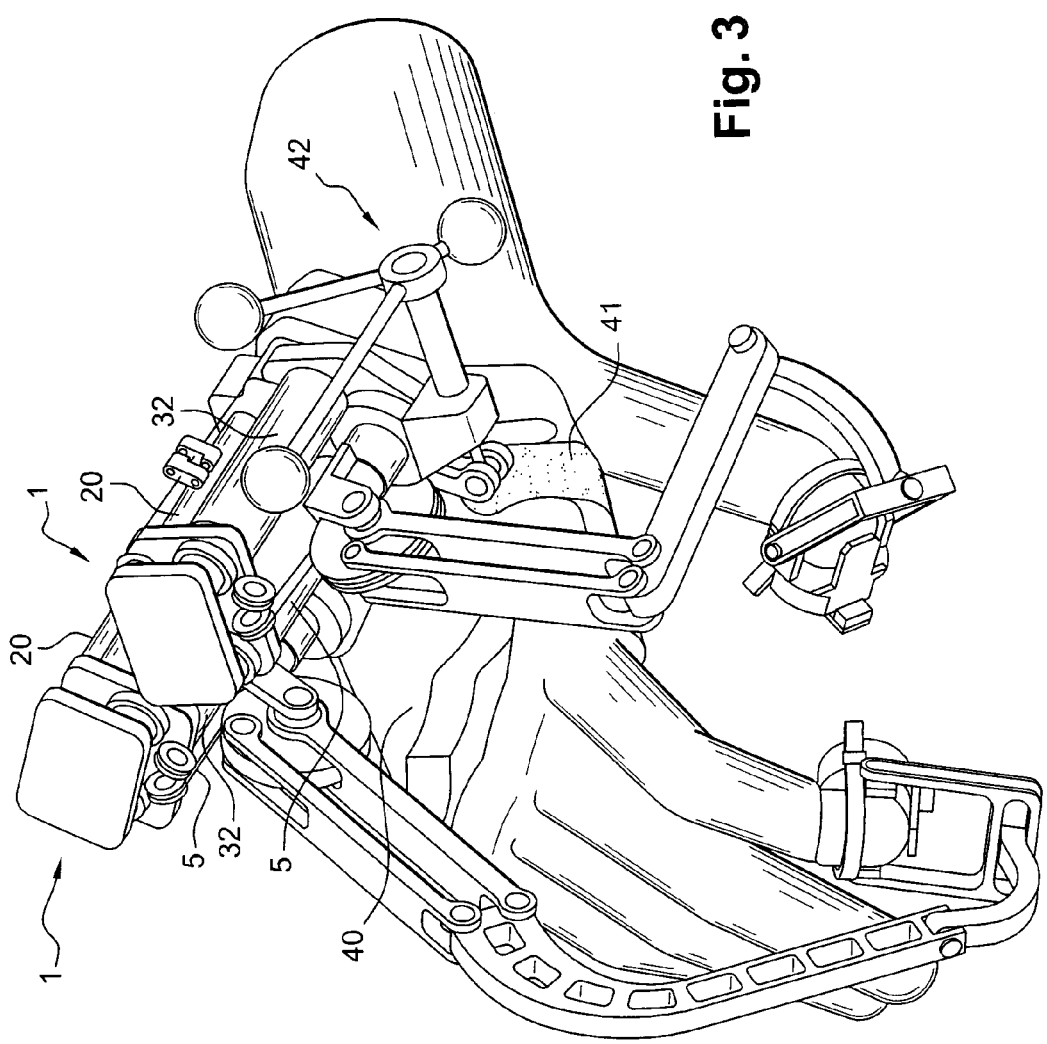
Figure 4:
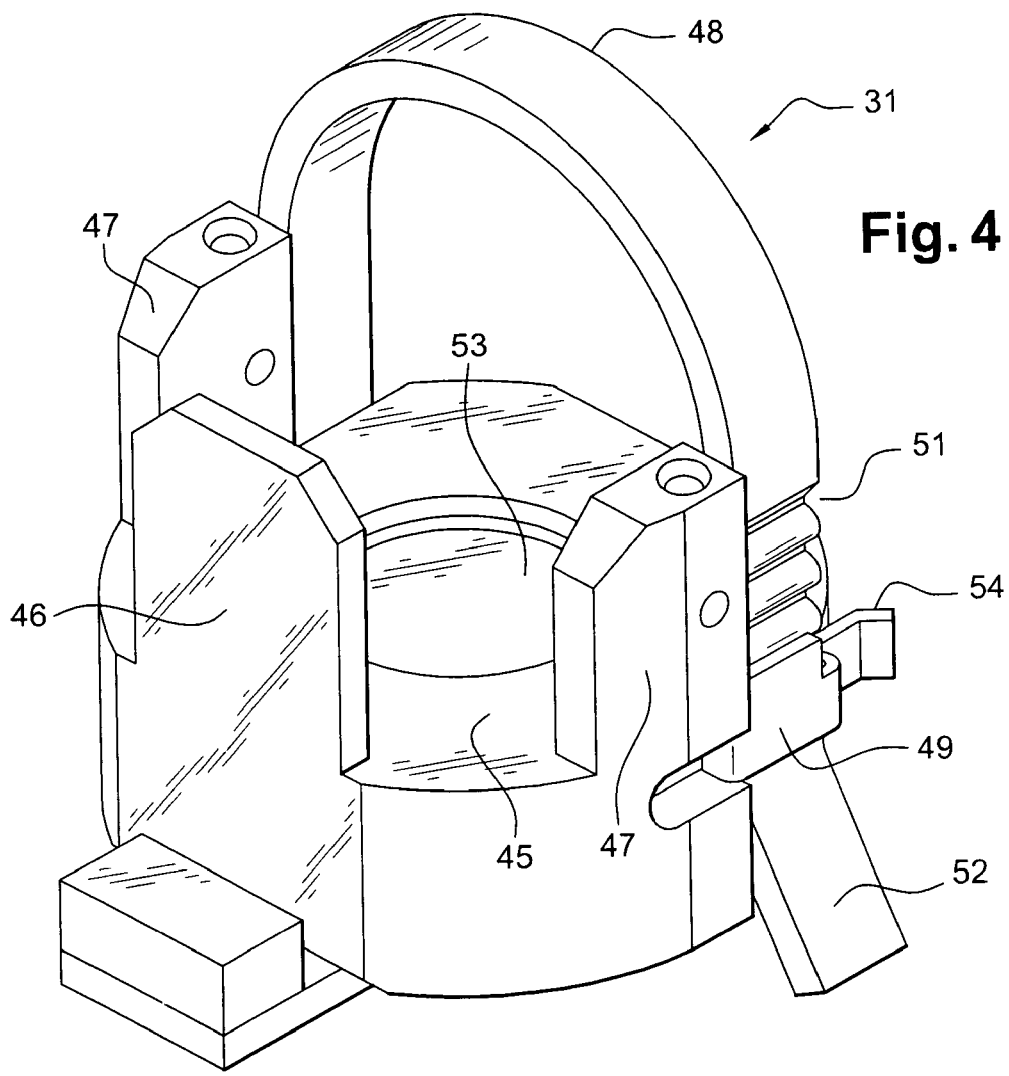
Figure 4A:
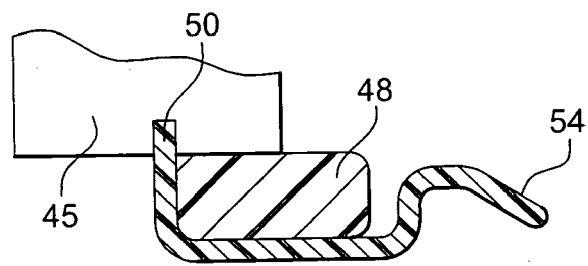

The mentioned characteristics of the invention and others will now be described in more detail with reference to the following figures:

FIG. 1 is an overview of a fragment of an actuation block complying with the invention, FIG. 1A is a top view of a fragment of this block, FIG. 2 is a view of a manual interface, FIG. 3 is a view of a double manual interface worn by an operator, FIG. 4 is a view of a finger grip at the end of the train of segments, FIG. 4A is a detail of this finger grip.

With reference to FIG. 1, it can be seen that the actuation block that is partly shown comprises an end plate 1 composed of parts including a main plate 2 and attachments 3 and 4, in which a motor 5 is mounted on the main plate 2 and normally comprises a displacements encoder not shown in detail. The motor shaft or the output shaft is marked as reference 6 and extends in the vertical direction in the figure, that is also the main extension direction of the motor 5. The output shaft 6 drives a drive pulley 7 through a cable 8 tensioned by a turnbuckle 9, a reception pulley 10 through four guide pulleys 11, 12, 13 and 14 arranged such that the drive pulley 7 is between the pulleys 11 and 14, and the driven pulley 10 is between pulleys 13 and 14. The guide pulleys 11 to 14 are arranged in an arrangement like a rectangle, the pulleys 11 and 12 being aligned vertically and pulleys 13 and 14 being aligned or slightly offset. Furthermore, the driven pulley 10 is tangent to the tangent plane at pulleys 13 and 14 such that the cable 8 has two straight free strands between pulleys 13, 10 and 14; and the drive pulley 7 is at the same height as the guide pulleys 11 and 14 between which it extends, and is tangent to their alignment so that the cable 8 can form two straight free strands between the drive pulley 7 and these guide pulleys 11 and 14.

The driven pulley 10 belongs to a second segment 15 of a train of segments for which the first segment 16 has been shown mounted on the attachment 4 by a bearing not shown and that comprises a hollow portion 17 through which the cable 8 passes, and a support clevis 18 of an axis 19 to which the second segment 15 and its driven pulley 10 are articulated. The guide pulleys 12 and 13 are mounted on the attachment 3 such that this attachment fits below the first segment 16. The first segment 16 is mounted on the attachment 4 by a pivoting articulation, in other words it turns around itself and more precisely about a vertical axis practically parallel to the free lengths of the cable 8 between the guide pulleys 13 and 14. One particular feature of the assembly is that, while the guide pulleys 11 to 14 and the driven pulley 10 turn around horizontal spindles, the spindles of the drive pulley 7 defined by the output shaft 6 is vertical, which is made possible due to the flexibility of the cable 8 so that the motor 5 can be placed parallel to the first segment 16 with a limited overall width despite the presence of several guide pulleys. Furthermore, the arrangement of the cable 8 with the free length adjacent to the driven pulley 10 that passes close to the rotation axis of the first segment 16, provides a means of decoupling the movements of segments 16 and 15 because a rotation of the first segment 16 has little or no influence on the cable 8.

Another motor 20 controls the first segment 16. This motor is only partly visible in FIG. 1 but can also be seen in FIG. 1A. It is parallel to the motor 5 associated with the second segment 15 and is side by side with it. In particular, it also comprises a vertical output shaft 21, in this case output at the bottom of the motor. This output shaft 21 comprises a drive pulley 22 that drives a cable 23 and rotates a driven pulley 24 fixed at the bottom of the first segment 16 facing the previous pulley. No guide pulley is necessary in this case, the two pulleys having parallel axes close to each other.

We will now consider the description of a manual interface with reference to FIG. 2. In this Figure, apart from the end plate 1, the first segment 16 and the second segment 15 can be seen with a third segment 28, a fourth segment 29, a clevis 30 forming a fifth segment and a finger grip 31 forming a sixth segment, all articulated one after the other. The base 1 comprises elements used up to now and particularly the motors 5 and 20, and also a third motor 32 equipped with a cable transmission 33 to control the third segment 28. This is done using connecting rods 34 articulated to the third segment 28 in the form of a parallelogram with the second segment 15, the connecting rods 34 also being articulated to a driven pulley 35 arranged side by side with the driven pulley 10, mounted on the same axis 19 but with independent movements. The cable 33 is responsible for rotation of the driven pulley 35 and thus modifies the inclination of the third segment 28 without moving the cable 8. The motor 32 and the motor 5 are placed side by side on the main plate 2 of the end plate 1, and they and their transmissions are similar to each other; as shown in FIG. 2, their output shafts and their main extension directions are parallel; drive pulley and guide pulley systems are also identical and oriented in the same way. All that is necessary is to place the cable 33 at a distance from the cable 8 of the motor 5 such that rotations of the first segment 16 apply a small force on the cable 33 and movements of the third segment will not be as well decoupled. The two cables 8 and 33 can also be placed on each side of the rotation axis of the segment 16 to improve the behaviour of the transmission (33, 34, 35).

The axes 19 and 36 of the second and the third segments 15 and 28 are parallel to each other and are perpendicular to the axis of the first segment 16, so that the end of the third segment 28 can be placed anywhere within a working volume of the train. The spindles of segments 29, 30 and 31 are all perpendicular to each other or at least are not parallel, so that the end of the train, in other words the finger grip 31, can be placed at the end of the train at any orientation. The result is thus a train of segments with six degrees of freedom substantially decoupled because translation movements of the finger grip 31 are essentially accomplished by movements of the first three segments 16, 15 and 28 and its rotations are accomplished by movements of the last three segments 29, 30 and 31. This distribution of the articulated segments is conventional and therefore the invention does not relate to it. Similarly, the articulations of segments 29, 30 and 31 may conventionally be provided with motors with force return so that they can be kept in the required state, and possibly with encoders to give position indications.

A pair of similar interfaces of the type shown in FIG. 2 is shown in another usage case in FIG. 3, in which they lead to a user's thumb and index finger engaged in the finger grips 31. The end plates 1 are mounted on a common support 40 placed on the back of the hand and held by a strap 41 pressing on the skin. A target 42 is shown as a reminder also installed on the common support 40 and composed of three balls forming an irregular triangle in order to indicate the position and orientation of the hand in space to a picture taking device not shown, by measuring the shape and dimension of the triangle on the image, which can be useful in some applications. This conventional device will not be described further. Similar interfaces could be combined for all fingers of the hand.

The actuation blocks are placed side by side with motors arranged flat on the back of the hand, the first segments 16 being oriented towards the end of the hand and parallel to the back of the hand, the second segments 15 extending approximately as far as the contour of the hand and the third segments 28 extending above the fingers. It can be seen that this manual interface is compact and is easily handled, its body all being located in the immediate vicinity of the operator's hand due to orientation of the motors and assembly of the first segments 16 onto the base with pivoting articulation.

The pivoting articulations between the first segments and the end plate, by which the first segments occupy unchangeable positions, can be used in combination with the flexible cable transmissions, to place the motors associated with the following segments on the base.

Control of the third segments 28 by the connecting rods 34 as a parallelogram with the second segments 15 provides good decoupling of segment movements by avoiding cable returns along the segments, which would be contrary to the purpose of the invention.

The finger grips 31 will be described in more detail with reference to FIG. 4. They comprise a base 45 on which the user places the digital pulp of the chosen finger, a stop 46 at the end of the base 45 to adjust the advance of the finger, two lateral stops 47 on the two sides of the base 45, and an arc-shaped strap 48 placed behind the lateral stops 47 to retain the finger on the base 45. The strap 48 may be made of an elastic material. It is complemented by metallic elastic or plastic hooks 49 that clamp its ends and are also provided with a lateral tab 50 entering a corresponding slit of the base 45 (FIG. 4A). Furthermore, the strap 48 is provided with notches 51 and a clamping tab 52 at the end of the two sides. The strap 48 is opened and the finger is released by moving the hooks 49 apart at their ends 54. When the ends 54 are released, the strap 48 is pressed into contact with the base 45 and remains in place. Pulling on the clamping tabs 52 moves the notches past the hooks 49 and the strap 48 is retightened onto the finger nail.

Another possibility with the invention is that a touch-sensitive actuator 53 can be arranged in the base 45, this actuator being a device capable of transmitting a vibration to the finger and corresponding information to its owner under specific conditions that depend on the application of the interface, such as simulation, learning or games.

The invention claimed is:

1. Manual interface, characterised in that it includes an actuation block comprising a base (1), a first segment (16) articulated to the base and a second segment (15) articulated to the first segment, two motors (20, 5) and two cable transmissions (7 to 14, 22 to 24) each associated with rotation movements of the segments, the rotation movements of the first segment (16) being pivoting, the motors being installed on the base (1) and having a main extension direction coinciding with the direction of an output shaft (21, 6), the main extension directions of the two motors being parallel to the first segment (16); and a means of fastening the base, a train of articulated segments (16, 15, 28 to 31) including the segments of the actuation block and one end of the train of segments gripped by a user.

2. Manual interface according to claim 1, characterised in that the end (31) includes a base (45) for placing the digital pulp of a user's finger, a stop (46) for the end of the finger, and a strap (48) clamping the finger nail.

3. Manual interface according to claim 2, characterised in that the base comprises a touch sensitive actuator (53).

4. Manual interface according to claim 3, characterised in that the train of segments comprises six degrees of freedom.

5. Manual interface according to claim 3, characterised in that the actuation block comprises a third segment (28) articulated to the second segment (15), a third motor (32) being mounted on the base, a third transmission (33, 35, 34) between the third motor and the third segment, the third motor having a main extension direction coinciding with the direction of an output shaft parallel to the first segment.

6. Manual interface according to claim 2 characterised in that the train of segments comprises six degrees of freedom.

7. Manual interface according to claim 2, characterised in that the actuation block comprises a third segment (28) articulated to the second segment (15), a third motor (32) being mounted on the base, a third transmission (33, 35, 34) between the third motor and the third segment, the third motor having a main extension direction coinciding with the direction of an output shaft parallel to the first segment.

8. Manual interface according to claim 1, characterised in that the train of segments comprises six degrees of freedom.

9. Manual interface according to claim 8, characterised in that the actuation block comprises a third segment (28) articulated to the second segment (15), a third motor (32) being mounted on the base, a third transmission (33, 35, 34) between the third motor and the third segment, the third motor having a main extension direction coinciding with the direction of an output shaft parallel to the first segment.

10. Manual interface according to claim 1, characterised in that the actuation block comprises a third segment (28) articulated to the second segment (15), a third motor (32) being mounted on the base, a third transmission (33, 35, 34) between the third motor and the third segment, the third motor having a main extension direction coinciding with the direction of an output shaft parallel to the first segment.

* * * * *